Sept. 9, 1958

R. P. LAPPALA 2,851,389

REINFORCED TEAR-RESISTANT MATERIAL

Filed Feb. 4, 1957

INVENTOR.
RISTO P. LAPPALA
BY
*John L. Diehl*
Attorney

Sept. 9, 1958 R. P. LAPPALA 2,851,389
REINFORCED TEAR-RESISTANT MATERIAL
Filed Feb. 4, 1957 3 Sheets-Sheet 2

INVENTOR.
RISTO P. LAPPALA
BY
Attorney

Sept. 9, 1958          R. P. LAPPALA                2,851,389
                REINFORCED TEAR-RESISTANT MATERIAL
Filed Feb. 4, 1957                              3 Sheets-Sheet 3

INVENTOR.
RISTO P. LAPPALA
BY
Attorney

United States Patent Office 2,851,389
Patented Sept. 9, 1958

2,851,389
REINFORCED TEAR-RESISTANT MATERIAL

Risto P. Lappala, Madison, Wis., assignor, by mesne assignments, to Griffolyn Company, Inc., Madison, Wis., a corporation of Delaware Application February 4, 1957, Serial No. 637,982

10 Claims. (Cl. 154—46)

This invention relates to a material comprising two films of flexible synthetic resin adhesively secured together with means therebetween adapted to provide tear resistance.

This application is a continuation-in-part of my co-pending application Serial No. 367,317, filed July 10, 1953, and now abandoned.

A superior sheet material is desirable which may be used for parachutes and also incidentally may be used in other applications such as raincoats, tarpaulins and the like. A parachute material should be extremely light but extremely strong, that is it should have a very high tensile and bursting strength per unit weight. It is also necessary or desirable that parachute material and also material for items such as raincoats and tarpaulins should be tear-resistant so that when a tear or rip is started in the material by puncturing or by snipping with a scissors, the tear does not propagate or at least does not propagate easily across the material. Conventional woven fabrics have been used heretofore for parachutes; fabrics woven with nylon or silk utilizing a box-weave have been satisfactory. It has been desirable to provide a material having greater strength per unit weight and greater durability and especially greater heat resistance. Heat resistance is a quality which has become more important with the increased speeds of aircraft. This invention provides a superior material which has high strength per unit weight and very great tear resistance and which also has higher heat resistance than materials used heretofore and also much greater resistance to incidental damage which may be caused by friction, sharp articles, abrasion, etc. It differs from materials which have previously been prepared and which appear visually quite similar in its tear resistance and its mode of construction as will be set forth hereinafter more specifically.

An object of the invention is therefore to provide a material which has great strength per unit weight and which has great tear-resistance, great resistance to heat and great resistance to incidental abrasive and puncturing influences.

Another object is such a material which may be made more easily and economically than by weaving.

Another object is such a material which comprises continuous synthetic resin sheets.

Further objects will become apparent from the drawings and the following detailed description in which it is my intention to set forth the applicability of the invention without thereby intending to limit its scope to less than that of all equivalents which will be apparent to those skilled in the art and in which like reference numerals refer to like parts and in which.

Figure 1:
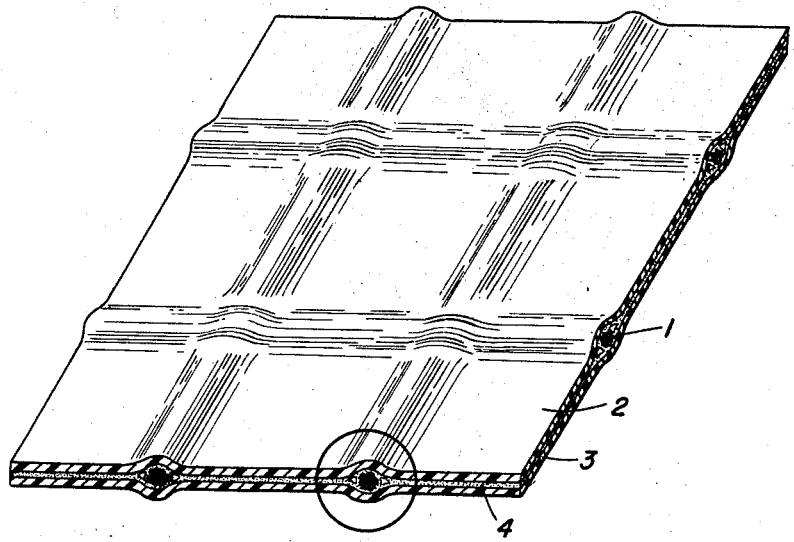
Figure 1 is a perspective view of a small portion of a sheet according to the invention.
Figure 2:
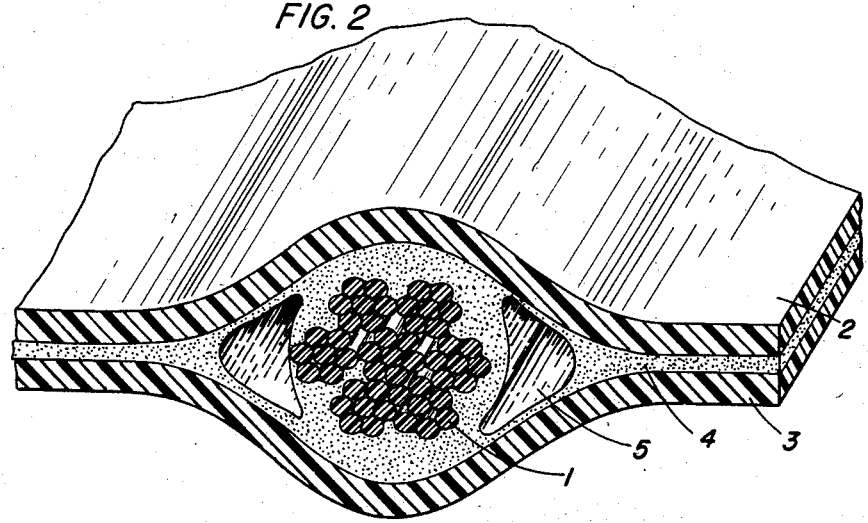
Figure 2 is an enlarged perspective view of the encircled portion of the sheet of Figure 1.

According to a preferred embodiment of the invention, as shown in Figures 1 and 2, a grid or screen of strands 1 is provided. Sheets 2 and 3 of transparent flexible synthetic resin are then secured to each side of said grid with a tacky adhesive 4, which is adapted to remain tacky substantially permanently and not to harden to either flexible, rubbery or rigid form. Air spaces 5 may exist adjacent the strands but are not believed necessary.

The strands must be multifilamentary strands 1 as shown in Figure 2, usually containing from ½ to 1 turn per inch and thus being only slightly twisted although generally referred to as untwisted (twist may be from ½ turn per foot to about 4 turns per inch). Monofilamentary yarns are generally not preferred due to low resistance to repeated sharp bendings and have generally been found to be generally unsuitable for the invention. Strands of either natural organic materials or synthetic organic materials may be utilized, the latter being preferred. Strands of modified natural material such as strands coated or impregnated with a cellulose polymer or synthetic resin may also be used; likewise strands of several types may be used in the same sheet of material. Natural yarns which may be used for strands include cotton, hemp, jute, and wool; synthetic yarns which may be used include zein, viscose rayon, acetate rayon, polyvinyl chloride, polyvinylidene chloride, co-polymers of polyvinyl and polyvinylidene chloride, co-polymers of vinyl chloride and vinyl acetate, polystyrenes, polyethylenes, polyamides, polyacrylonitriles, polyesters, cyanoethylated cotton, cellulose acetate and cellulose acetate butyrate.

Strands of inorganic material such as glass, rock-wool and asbestos have been found unsuitable due to breakage of the strands when the laminate is sharply folded on successive occasions on the same line.

Preferred materials for strands thus include multifilamentary materials such as polyamides (nylon), polyesters (Dacron and Terylene), polyacrylonitriles (Orlon) and cyanoethylated cotton (Fortisan) generally in the form of roving having a twist of from ½ turn per foot to 4 turns per inch.

Any suitable diameter or weight of yarn may be used, preferred weights being in the range of about 500 to 2400 denier.

Figure 3:
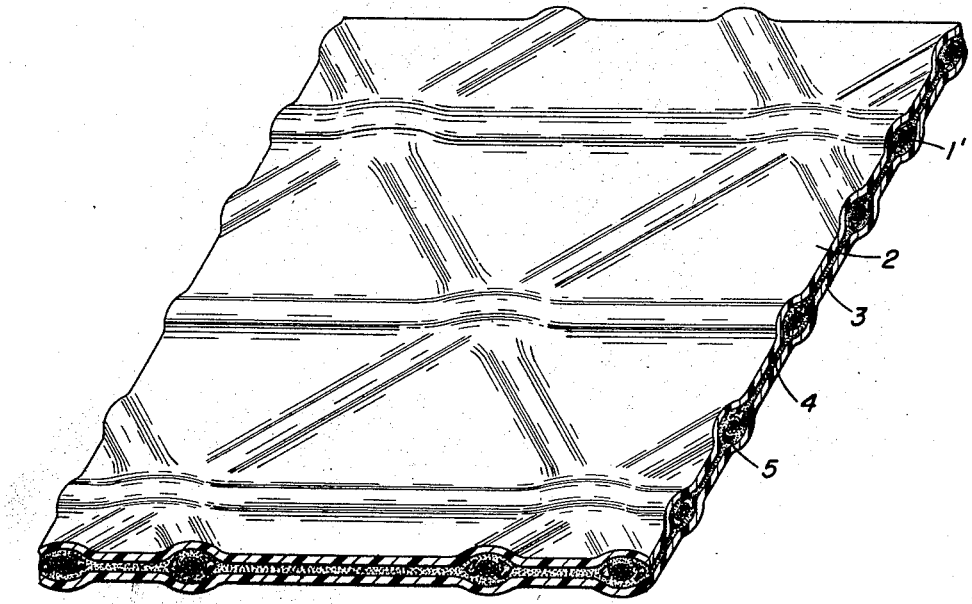
Figure 3 is a perspective view of a small portion of a sheet according to another embodiment.

The grid of strands may be rectilinear in form, as shown in Figure 1, or may have any other suitable pattern, such as the triangular grid shown in Figure 3.

As shown in the figures, the grid or screen of strands of yarn is preferably non-woven. A non-woven grid is preferable in order to provide tear-resistance.

Figure 4:
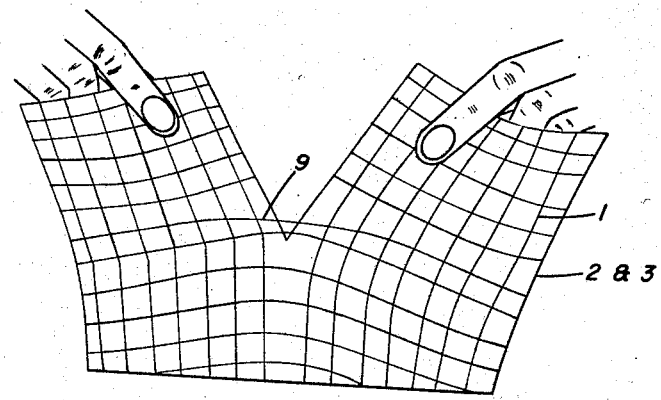
Figures 4 and 5 are perspective views of a sheet of material of the invention being torn by human hands illustrating sequential steps in the propagation of a tear in the sheet.
Figure 5:
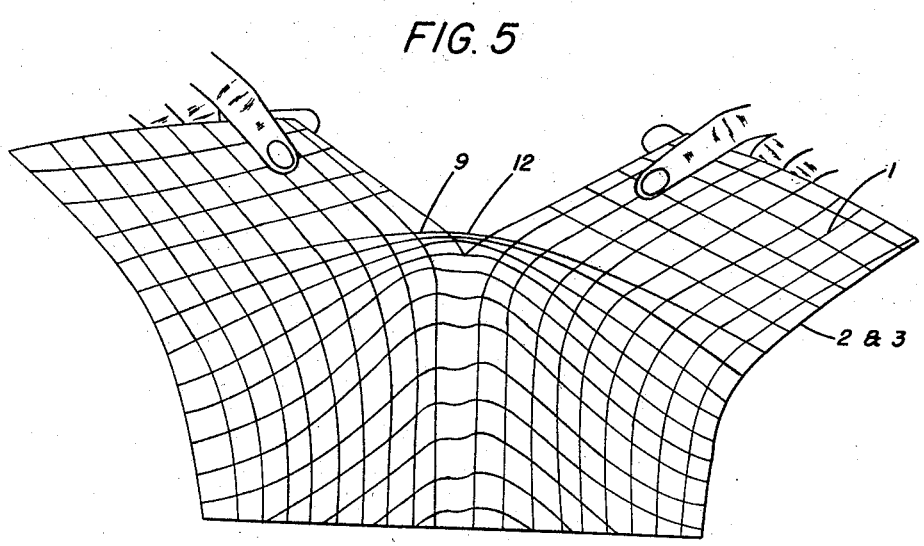

The material, when torn, undergoes a characteristic action which is illustrated in Figures 4 and 5. The strands 1 of the grid slide in the adhesive 4, and instead of breaking, pile up on one another so that as the tear propagates in the synthetic resin films, more and more strands become stressed, each sliding longitudinally and sideways (as shown at places designated by the numeral 9) through the adhesive until the tear is stopped by virtue of a rope or cord 12 (untwisted) formed by a plurality of strands extending across the tear substantially normal to the line of propagation of the tear itself. This behavior is characteristic of the material of the invention.

The two films, one on each side of the grid, may be of the same synthetic resin or may be of different synthetic resins. Generally it is preferable that each of the films be transparent and flexible. It is also preferable, but not necessary, that at least one of the films be a transparent flexible polyester synthetic resin and a preferred material for such film is a polyester formed by the condensation of ethylene glycol and terephthalic acid which is sold commercially as Mylar or Terylene. A preferable polyester film is one in which the polymer molecules have been oriented after formation of the film to provide great tensile and flexural strength.

The second film may be a similar polyester synthetic resin or may be another synthetic resin adapted to contribute other properties to the material such as printability, drape, feel, and so forth. It may for example be selected from the following group: polyethylene, plasticized or unplasticized films of polyvinyl chloride or polyvinyl acetate or polyvinylidene chloride or co-polymers of two or more of these, i. e chlorinated polyethylene, chlorosulphonated polyethyelne, polytetrafluoroethylene, polychlorotrifluoroethylene, other halogenated polyethylenes, polyamides, polyvinyl alcohol, regenerated cellulose, cellulose esters such as cellulose acetate, cellulose ethers such as ethyl cellulose.

It is critical to the invention that the films be non-fibrous and non-porous in order to allow the strands to slip and slide easily through the adhesive when the material is torn and to thus provide the desired tear-resistance. Material of a fibrous nature, such as paper and the like, is generally unsuitable.

Such material of a fibrous nature, generally including paper of all types such as kraft, glassine, bond and the like, generally exhibits the disadvantage that the crease-resistance of the best of such materials as represented by the ability to withstand repeated folding is very low as compared to a film of comparable thickness of synthetic resin and has the further disadvantage that a rip propagates in a direction controlled by the grain of the paper causing significant reduction in tear resistance.

Suitable results are obtained only if such films are less than .015 inch thick and preferred results are obtained with films of thicknesses of from about .25 mil or .5 mil up to 4 mils and in any event less than 10 mils, i. e., .010." Such films are not only flexible but are also characterized by being readily foldable, that is, they may be folded repeatedly in the same place without thereby being damaged or caused to take a permanent set. Such films as hereinbefore mentioned fulfill these requirements, whereas no paper or other fibrous material is known which in any way exhibits any such properties.

Preferred films are characterized by a high elongation (greater than about 20% up to 800%)before tensile failure. The elongation of paper sheets is not known to exceed about 5% at most and is generally 1 to 3%.

The films are adhered together with an adhesive which is adapted to remain tacky or non-setting permanently or for at least the life of the material which might reasonably be regarded as from 5 to 15 years. The adhesive may be transparent and must be transparent if a transparent embodiment of the structure is desired.

In order to provide decorative effects or various colors, a number of practices may be followed: carbon-black may be added to an otherwise transparent adhesive to provide a black opaque sheet. A black opaque sheet may also be provided by utilizing an asphaltic or pitch compound as an adhesive. To provide decorative effects, color pigments may be added to an otherwise transparent or clear adhesive. Decorative effects may also be provided by printing upon the inner surface of one of the transparent flexible synthetic resin films. Since it is difficult and generally unsuitable and unpractical to print at the present time upon flexible transparent oriented polyester synthetic resin films it is generally found best to print upon a film of vinyl resin, polyethylene or the like or other synthetic resin as set forth in the above listed group.

Startling effects have been produced by evaporating aluminum against a surface of a transparent flexible polyester synthetic resin (Mylar) sheet and preparing the tear-resistant sheet structure of the invention with such aluminized surface adjacent the adhesive. A raincoat has been prepared with this material and worn.

Various examples of the material of the invention were prepared as shown in Tables 1 and 2.

Seams in the material of the invention are most suitably made by cementing, by heat sealing, by heat sealing with a tape of thermoplastic resin interposed in the seam or by providing a double row of stitching in a fell seam, often with a tape of such material as .006" cellulose acetate 16 mm. wide or a cotton tape about ¾" wide inserted therein.

TABLE NO. 1

*Adhesives*

| Adhesive Designation | Formulation |
|---|---|
| A | 100 parts synthetic Butyl rubber sold commercially as GRI-17 by Enjay.<br>33 parts mixture of two or more chlorinated biphenyls [1] (Arochlor 5460).<br>200 parts xylene. |
| B | 2 parts synthetic Butyl rubber sold commercially as GRI-25 by Enjay.<br>1 part mixture of two or more chlorinated biphenyls [1] (Arochlor 1262).<br>5 parts xylene. |
| C | 2 parts synthetic Butyl rubber sold commercially as GRI-15 by Enjay.<br>1 part mixture of two or more chlorinated biphenyls [1] (Arochlor 5460).<br>5 parts xylene. |
| D | 16 parts synthetic Butyl rubber sold commercially as GRI-17 by Enjay.<br>5 parts mixture of two or more chlorinated biphenyls [1] (Arochlor 5460).<br>40 parts kerosene fraction. |
| E | blackstrap molasses. |
| F | asphalt dissolved in hydrocarbon. |

[1] Mixture comprising two or more of the following chlorinated biphenyls:
monochlorobiphenyl    hexachlorobiphenyl
dichlorobiphenyl    heptachlorobiphenyl
trichlorobiphenyl    octachlorobiphenyl
tetrachlorobiphenyl    nonachlorobiphenyl
pentachlorobiphenyl    decachlorobiphenyl Butyl (trademark, registered by Standard Oil Company of New Jersey) is an isobutylene-diolefin copolymer. It is a vulcanizable hydrocarbon rubber which is not readily attacked by oxygen, ozone, acid, alkalis and other chemical agents which are harmful to natural (Hevea) rubber. It has low unsaturation. The specific gravity of Butyl is 0.92. It is a solid elastic odorless non-toxic light colored hydrocarbon rubber. It is manufactured according to the specifications of the Reconstruction Finance Corporation office of Rubber Reserve, effective January 1, 1947, and revised April 1, 1947, March 15, 1948, and June 1, 1948. The specification limits for GR–I are:

CHEMICAL PROPERTIES

Volatile Matter, percent max ------------------ 0.30
Ash, percent max ---------------------------- 0.50
Stabilizer, percent min --------------------- 0.10

VISCOSITY

Mooney plasticity (large rotor, 8 mos. at 212° F.:
Min ------------------------------------- 41
Max ------------------------------------- 49

| Physical Properties at 82 F. | Cure at 307 F., Min. | | |
|---|---|---|---|
|  | 20 | 40 | 80 |
| Tensile Strength, p. s. i., min |  | 2,500 |  |
| Ultimate Elongation, percent, min |  | 650 |  |
| Modulus at 400% Elongation, p. s. i. |  |  |  |
| Min | 575 | 875 | 1,200 |
| Max | 775 | 1,125 | 1,500 |

GR–I–15 is similar to GR–I except that it contains a greater proportion of diolefin and, therefore, exhibits a faster rate of cure. The specifications for Mooney plasticity and chemical properties are the same as for GR–I. GR–I–25 is more unsaturated than GR–I–15 and, therefore, is faster curing. The specifications for Mooney plasticity and chemical properties are the same as for GR–I. GR–I–17 is believed to be between GR–I–15 and GR–I–25 with respect to proportion of diolefin and rate of cure.

did not cause tears to propagate from these perforations nor did subsequent tests cause the holes to enlarge.

A raincoat was made from the material of Example 1. It was made in a size which would fit a man about 6 feet in height and was found to have a weight of 393 grams. A raincoat of vinyl resin film of the same size

TABLE NO. 2

| Example | Nominal thickness in inches of films of synthetic resin | | Yarn | Adhesive (See Table 1) | Spacing of Grid (inches) | Burst Strength (lbs. per sq. in.) | Tensile Strength (1 in. wide) strip (lbs.) |
|---|---|---|---|---|---|---|---|
| | 1st Film | 2nd Film | | | | | |
| 10 | .0005 Mylar | .0005 Mylar | Small Dia. Dacron | [1] B | 3/16 x 3/16 | 78 | 40 |
| 11 | do | do | V–15 Dacron | [1] C | 3/16 x 3/16 | 100 | 40 |
| 12 | do | do | do | D | 3/16 x 3/16 | 105 | 40 |
| 13 | do.[2] | do.[2] | do | A | 3/16 x 3/16 | 100 | 40 |
| 14 | .0015 polyvinyl chloride | .0015 polyethylene | do | A | 3/16 x 3/16 | [3] 60 | 20 |
| 15 | .0005 Mylar | .0015 polyvinyl chloride | do | A | 3/16 x 3/16 | 80 | 30 |
| 16 | do.[2] | .0005 Mylar | do | A | 3/16 x 3/16 | 98 | 40 |
| 17 | do.[2] | do | do | A | 7/16 x 7/16 | 93 | 30 |
| 18 | do | do | 4-ply untwisted Dacron | A | 3/16 x 3/16 | 220 | 93 |
| 19 | do | do | do | E | 3/16 x 3/16 | 180 | 40 |
| 20 | do | do | V–15 Dacron | E | 3/16 x 3/16 | 90 | 40 |
| 21 | do | do | do | F | 3/16 x 3/16 | 95 | 40 |
| 22 | do | do | No. 50 cotton | A | 3/4 x 3/4 | 90 | [5] [4] 26 |

[1] Too tacky to sew.
[2] Aluminized.
[3] Reached limiting value; did not break.
[4] Made in continuous production.
[5] Tested on the bias.

Suitable results are obtained only if the adhesive is applied in the amount of 1/4 ounce to 3 ounces per square yard of surface of the laminate and preferable results are obtained with amounts of from 1/2 ounce to 2 ounces per square yard; a layer of this very considerable thickness is necessary in order to provide the resistance to rips which characterizes the material.

A 29-inch diameter parachute with a 6½-inch diameter vent was constructed utilizing the material of Example 1. This parachute was dropped from the top of a tower of 80 ft. height to observe the opening characteristics of the parachute and to test the strength of the material and of the seams. The parachute opened in every case; no rupture or tear of the material or seams was observed. Moving pictures taken of these operations indicated the rate of fall was about 8 ft. per second.

Another 29-inch diameter parachute similar to the parachute previously mentioned was enclosed in a mailing tube and was attached with nylon cord to the projectile of a riot gun. A projectile weighing 101.5 grams fired with a 10 gram charge of powder was stopped when the parachute opened, after traveling about 12 feet. The same parachute was then attached to a projectile weighing 193.0 grams which was fired with a powder charge of 15 grams. When the parachute opened, the cord attaching the parachute to the projectile broke; no damage resulted to the parachute.

A parachute having a diameter of 56 inches was then constructed from the same material and was dropped from the top of a tower 80 feet in height attached first to a 2-pound weight, later to a 5-pound weight and finally to an 18-pound weight. No failures of material or seams were observed. Movies were taken which indicated the following terminal velocities respectively: 6 feet per second, 10 feet per second and 12 feet per second.

The same parachute was then opened while attached to the back of a moving truck and was tested while the truck was operating at 50 miles per hour and no failures or tears were observed in the material. In one or two tests the parachute dragged against the surface of the road and as a result picked up or bumped into a plurality of small rocks which were a part of the surface of the gravel road on which the tests were conducted. The parachute material was perforated in several places by these rocks. Subsequent openings of the parachute weighs about 295 to 480 grams. The coat was found to be comfortable to wear and eminently satisfactory as a raincoat.

The unusually great resistance to ripping which has been found to be exhibited by the material of the invention is due to the combination of adhesive of the permanently tacky kind described, applied to the thickness described, together with fibers having the above described limitations and likewise films specifically as described above and such characteristics are not exhibited by laminates wherein one of the essential elements as set forth herein of the combination is omitted. The desirable properties of the material are not due to any one nor to most of the elements nor do they increase in proportion as a laminate is made which embraces more and more of the necessary elements of the combination but are found only with the material which has all of the elements and are not found with the material in which any one of the elements is omitted.

It may thus be seen that the invention is broad in scope and is not to be limited excepting by the claims. Having thus disclosed my invention, I claim:

1. A laminate of two films each less than .015 inch thick of flexible foldable non-fibrous synthetic resin characterized by 20% to 800% elongation before tensile failure, adhesively attached together with a substantially permanently tacky adhesive and having embedded in said adhesive a grid of fibrous organic polymeric substantially only slightly twisted strands of multifilamentary roving, said strands being slidable both lengthwise and sidewise in said adhesive.

2. A laminate of two films each less than .015 inch thick of flexible foldable nonfibrous synthetic resin characterized by 20% to 800% elongation before tensile failure, adhesively attached together with a substantially permanently tacky adhesive in the amount of one-half ounce to two ounces per square yard of surface of the laminate and having embedded in said adhesive a grid of fibrous organic polymeric substantially only slightly twisted strands of multifilamentary roving, said strands being slidable both lengthwise and sidewise in said adhesive.

3. A laminate of two films each less than .015 inch thick of flexible foldable non-fibrous synthetic resin characterized by 20% to 800% elongation before tensile failure, adhesively attached together with a substantially permanently tacky adhesive and having embedded in said adhesive a grid of fibrous organic polymeric substantially only slightly twisted strands of multifilamentary 500 to 2400 denier roving having from one turn per foot to four turns per inch of twist therein, said strands being slidable both lengthwise and sidewise in said adhesive.

4. A laminate of two films each less than .015 inch thick of flexible foldable non-fibrous synthetic resin characterized by 20% to 800% elongation before tensile failure, adhesively attached together with a substantially permanently tacky adhesive in the amount of one-half ounce to two ounces per square yard of surface of the laminate and having embedded in said adhesive a grid of fibrous organic polymeric substantially only slightly twisted strands of multifilamentary 500 to 2400 denier roving having from one turn per foot to four turns per inch of twist therein, said strands being slidable both lengthwise and sidewise in said adhesive.

5. The laminate of claim 4 wherein said films are polyethylene terephthalate.

6. The laminate of claim 4 wherein said films are a plasticized synthetic resin selected from a group consisting of polymers of polyvinyl chloride and copolymers thereof with polyvinylidene chloride and polyvinyl acetate.

7. The laminate of claim 4 wherein said films are polytetrafluoroethylene.

8. The laminate of claim 4 wherein one of said films is polyethylene terephthalate and the other of such films is polyethylene.

9. The laminate of claim 4 wherein said films are halogenated polyethylene.

10. A laminate of two films each less than .015 inch thick of flexible foldable synthetic resin characterized by 20% to 800% elongation before tensile failure, adhesively attached together with a substantially permanently tacky adhesive and having embedded in said adhesive a grid of fibrous organic polymeric at least slightly twisted multifilamentary strands, said strands being slidable both lengthwise and sidewise in said adhesive.

References Cited in the file of this patent

UNITED STATES PATENTS

| | | |
|---|---|---|
| 1,867,071 | Collings et al. | July 12, 1932 |
| 2,281,635 | Strauss | May 5, 1942 |
| 2,679,969 | Richter | June 1, 1954 |
| 2,708,177 | Fries et al. | May 10, 1955 |
| 2,719,804 | Carlson | Oct. 4, 1955 |
| 2,742,391 | Warp | Apr. 17, 1956 |
| 2,772,993 | Magnuson | Dec. 4, 1956 |